Patented June 30, 1931

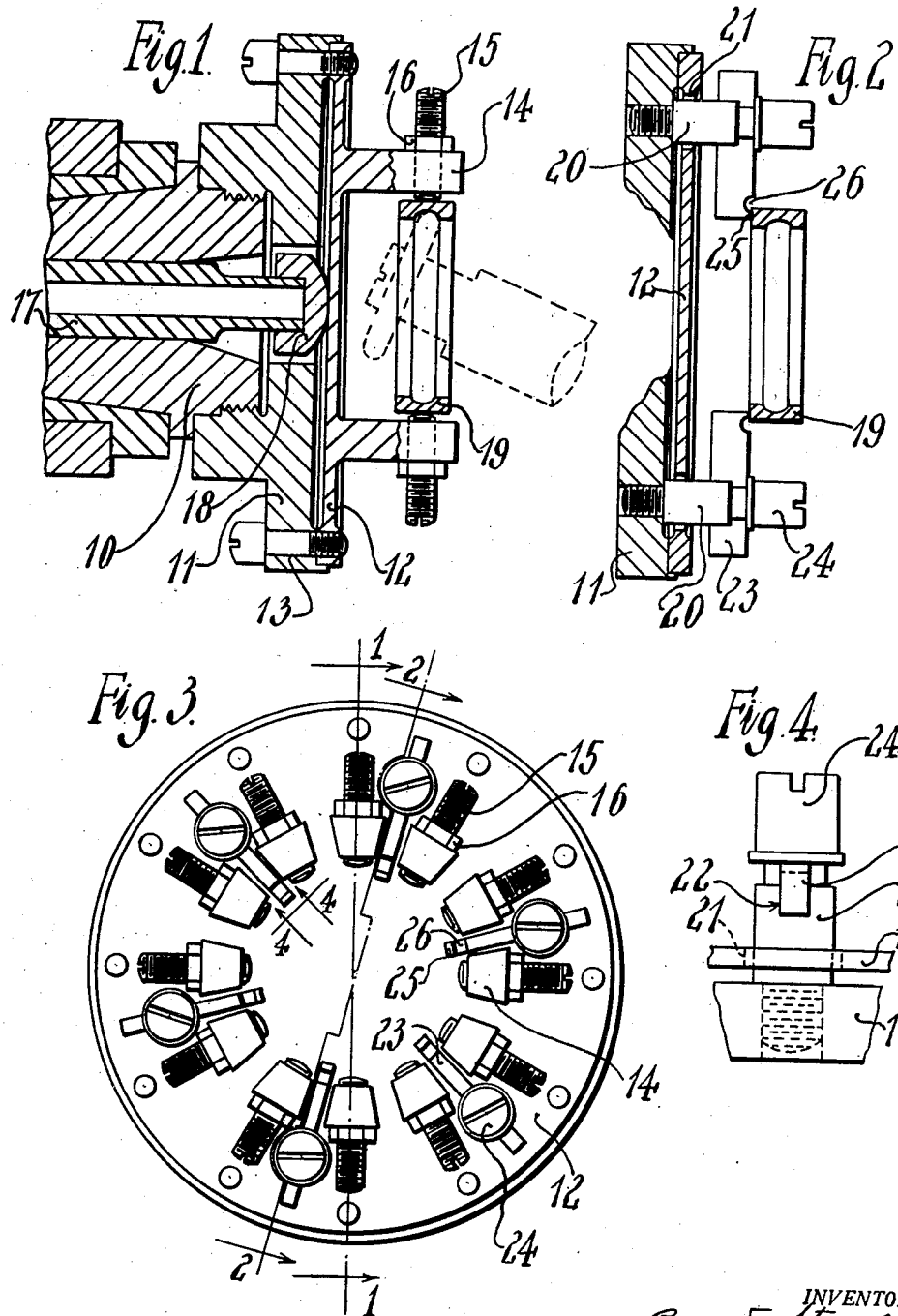

1,812,455

UNITED STATES PATENT OFFICE

BYRON F. STOWELL, OF SPRINGFIELD, MASSACHUSETTS, ASSIGNOR TO VAN NORMAN MACHINE TOOL CO., OF SPRINGFIELD, MASSACHUSETTS, A CORPORATION OF MASSACHUSETTS

DIAPHRAGM CHUCK

Application filed July 5, 1928. Serial No. 290,386.

This invention relates to chucks which, in the embodiment illustrated, are adapted particularly for holding the outer races of ball bearings for grinding. One object of the invention is to provide a chuck having an increased range of adjustments for holding work of widely varying diameters and widths.

Another object is to effect increased economy through the provision for utilizing reversible or interchangeable sets of article positioning bars or the like having shoulder supporting contacts formed at different depths.

A further object is to insure a uniform degree of extreme accuracy in the chuck when the rigid and also the flexible contacts are set for centrally locating and holding an article of any given diameter and width within the adjustable positioning range of the article positioning contacts and the gripping contacts.

Other and further objects will appear from the following specification and claims.

Referring to the drawings:

Fig. 1 is a longitudinal section through a chuck embodying my invention, taken on line 1—1 of Fig. 3 and omitting for the purpose of clearness parts of the mechanism to the rear of the section line;

Fig. 2 is a partial section on line 2—2 of Fig. 3;

Fig. 3 is an end view of the improved chuck; and

Fig. 4 is an enlarged detail taken on the line 4—4 of Fig. 3.

This invention in certain aspects is directed to an improvement on the type of chuck described in the application of Charles E. Van Norman, Serial No. 257,050, filed February 25, 1928. In that application is described a chuck having a plurality of radially swinging fingers mounted on a diaphragm or plate and adapted to grasp an article such as a ball race by its outer periphery. Stops for limiting the axial position of the ball race were shown in that application as mounted independently of the deflectable plate so as to provide a definite location for the article as it is grasped by the radially moving members.

The present invention is an improvement on this prior chuck in two particulars: the greater range of adjustment, and the enhanced accuracy with which the ball races are positioned in the commercial use of the device.

The chuck is mounted upon a rotatable spindle 10 carrying a chuck head 11. A plate 12, of sufficient flexibility to permit it to be very slightly bent by pressure exerted on its center, is secured to the head by screws 13. Projecting outwardly from an intermediate circumference of the plate is a series of lugs 14, each having a screw 15 threaded radially through it and locked in adjusted position by a nut 16. A rod 17 passes freely through the spindle 10 and has a convex end 18 bearing against the inner surface of the plate 12. By pressure exerted on this rod as described in the prior application referred to, the plate may be deflected slightly at its center, causing the lugs 14 and hence the screw 15 to move radially outwardly a slight amount sufficient to release an object normally held gripped between the inner ends of the screws.

Positioned intermediate the lugs 14, and for convenience located on a slightly larger circumference, are studs or supports 20 preferably passing freely through holes 21 in the plate 12 and preferably secured to the head 11. Each stud is slotted at 22 to receive a member 23 firmly held in position by a screw cap 24. The end of each member is provided with a bearing surface 25 separated from the body of the member by a concavity 26. The end surface 25 alone contacts with the ball race 19 and is of smaller area than the portion of the race adjacent the area of contact. This construction insures that the entire bearing surface 25 will be contacted with by each ball race that is placed in the chuck to be worked upon, and prevents any accumulation of dirt or grease which would destroy the accuracy of the device.

In use, the screws 15 are set to approximately the correct positions to receive a ball race 19 between them, and they are then ground accurately at their inner surfaces so that when the plate 12 is free the ball race will be tightly gripped by the screws. The members 23 are also set so that they limit the axial position of the ball race approximately and so that their bearing surfaces 25 will lie intermediate the end surfaces of the ball race. They are then clamped tightly by the screw caps 24 and are ground off accurately to the exact condition desired. By locating the bearing surfaces 25 at the end of radially adjustable members passing between the lugs 14, it is possible to accommodate a large variance in the size of the ball races which the chuck is capable of holding. Furthermore, by replacing the members 23 with others of different depths, variations in the widths of articles being dealt with can be readily accommodated.

I claim:

1. A chuck comprising a plurality of members arranged in a circular series, means for imparting to the members simultaneous radial movements, a plurality of supports mounted independently of the members and so as to be unaffected by their radial movements, and article stops adjustable on the supports in a radial direction for limiting the position of an object in a direction axially of the members.

2. A chuck comprising a plurality of members arranged in a circular series, means for imparting to the members simultaneous radial movements, a plurality of supports mounted independently of the members and so as to be unaffected by their radial movements, and article stops adjustable on the supports in a radial direction for limiting the position of an object in a direction axially of the members, said stops having effective article positioning surfaces lying wholly within the surface of the article.

3. A chuck comprising a rotatable head, a flexible plate secured peripherally to the head, a circular series of lugs extending laterally from an intermediate circumference of the plate, a radially adjustable member secured to each of said lugs and presenting an object holding surface at its inner end, a series of supports secured to the head and passing freely through holes in the plate of larger diameter than said support so that the supports will be unaffected by bending of the plate, stop bars adjustably secured in said supports and having article positioning surfaces thereon, and means for bending the plate axially so as to cause the holding members to be moved radially.

4. A chuck comprising a rotatable head, a flexible plate secured peripherally to the head, a circular series of lugs extending laterally from an intermediate circumference of the plate, a radially adjustable member secured to each of said lugs and presenting an object holding surface at its inner end, a series of supports secured to the head independently of the plate so as to be unaffected by bending thereof, stop bars adjustably secured in said supports and having article positioning surfaces thereon, said positioning surfaces being formed to engage in unison a surface of the article at separate portions thereof.

5. A chuck comprising a rotatable head, a flexible plate secured peripherally to the head, a circular series of lugs extending laterally from an intermediate circumference of the plate, a radially adjustable member secured to each of said lugs and presenting an object holding surface at its inner end, a series of supports secured to the head and passing freely through holes in the plate of larger diameter than said support so that the supports will be unaffected by bending of the plate, stop bars adjustably and replaceably secured in said supports and extending between the lugs to form article positioning surfaces, said positioning surfaces being less in area than the surface of the article adjacent their point of contact, and means for bending the plate axially so as to cause the holding members to be moved radially.

6. A chuck comprising a head, a flexible plate secured peripherally to the head, a circular series of spaced lugs extending laterally from an intermediate circumference of the plate and carrying object-gripping surfaces, and a series of stop members secured at a larger circumference than said lugs and passing between the lugs to present article-positioning surfaces limiting the position of an object in a direction axially of the circular series of lugs.

7. A chuck comprising a head, a flexible plate secured peripherally to the head, a circular series of spaced lugs extending laterally from an intermediate circumference of the plate, a radially adjustable member secured to each of said lugs and presenting an object grasping surface at its inner end, a series of supports secured at a larger circumference than said lugs, and a radially adjustable stop bar secured to each of said supports and passing between certain of the lugs to present article positioning surfaces limiting the position of an object in a direction axially of the circular series of lugs.

In testimony whereof I have affixed my signature.

BYRON F. STOWELL.